(12) United States Patent
Kato

(10) Patent No.: US 8,754,920 B2
(45) Date of Patent: Jun. 17, 2014

(54) SCANNING OPTICAL APPARATUS AND IMAGE FORMING APPARATUS INCLUDING THE SAME

(75) Inventor: Manabu Kato, Saitama (JP)

(73) Assignee: Canon Kabushiki Kaisha (JP)

( * ) Notice: Subject to any disclaimer, the term of this patent is extended or adjusted under 35 U.S.C. 154(b) by 299 days.

(21) Appl. No.: 13/372,947

(22) Filed: Feb. 14, 2012

(65) Prior Publication Data

US 2012/0218363 A1      Aug. 30, 2012

(30) Foreign Application Priority Data

Feb. 28, 2011   (JP) ................................. 2011-042071

(51) Int. Cl.
*B41J 27/00*   (2006.01)
*B41J 2/435*   (2006.01)

(52) U.S. Cl.
USPC ......................................... 347/243; 347/224

(58) Field of Classification Search
USPC ................. 347/250, 241, 236, 224, 243, 118;
359/738; 430/67; 250/205
See application file for complete search history.

(56) References Cited

U.S. PATENT DOCUMENTS

| 6,381,078 B1 * | 4/2002 | Yamaguchi et al. ........... 359/738 |
| 6,847,390 B2 * | 1/2005 | Maeda .......................... 347/250 |
| 6,853,397 B2 * | 2/2005 | Onishi .......................... 347/241 |
| 7,277,113 B2 * | 10/2007 | Sobue et al. .................. 347/250 |
| 7,498,110 B2 * | 3/2009 | Taniguchi et al. .............. 430/67 |
| 8,022,347 B2 * | 9/2011 | Tatsuno et al. ................ 250/205 |
| 8,164,611 B2 * | 4/2012 | Yamashita .................... 347/236 |

FOREIGN PATENT DOCUMENTS

| JP | 2002-196269 A | 7/2002 |
| JP | 2005-084565 A | 3/2005 |

* cited by examiner

*Primary Examiner* — Alessandro Amari
*Assistant Examiner* — Carlos A Martinez
(74) *Attorney, Agent, or Firm* — Rossi, Kimms & McDowell LLP

(57) ABSTRACT

A scanning optical apparatus includes: two light source units; a deflecting unit for deflecting two light beams for scanning; and two imaging optical systems disposed corresponding to the two light beams, in which: the two imaging optical systems form images of the two light beams on photosensitive members of different hues; the two imaging optical systems are disposed to be opposed with respect to the deflecting unit in a sub-scanning cross section; and a reflectance of a first reflecting optical element disposed in an optical path between the photosensitive member and the deflection surface passed by a light beam corresponding to an image of a hue having low brightness is lower than a reflectance of a second reflecting optical element disposed in an optical path between the photosensitive member and the deflection surface passed by a light beam corresponding to an image of a hue having high brightness.

11 Claims, 6 Drawing Sheets

SCANNING OPTICAL APPARATUS AND IMAGE FORMING APPARATUS INCLUDING THE SAME

BACKGROUND OF THE INVENTION

1. Field of the Invention

The present invention relates to a scanning optical apparatus and an image forming apparatus including the scanning optical apparatus, which are suitable for an image forming apparatus such as a laser beam printer, a digital copying machine, and a multifunction printer which use an electrophotographic process.

2. Description of the Related Art

Conventionally, in a scanning optical apparatus of the laser beam printer (LBP) or the digital copying machine, a light beam emitted from a light source unit after being modulated in accordance with an image signal is deflected periodically by a deflecting element (optical deflector) constituted of a polygon mirror. Then, the deflected light beam is condensed like a spot onto a recording medium surface of a photosensitive drum or the like by an imaging optical system having an fθ characteristic so as to scan the surface for recording an image.

There is known a color image forming apparatus including a tandem type scanning optical apparatus that includes multiple scanning and imaging functions described above, and optically scans the surfaces to be scanned corresponding to different hues simultaneously by different light beams (Japanese Patent Application Laid-Open Nos. 2002-196269 and 2005-084565). The tandem type scanning optical apparatus used for the color image forming apparatus has multiple light source units, and multiple light beams from the multiple light source units enter one or more deflecting elements. In this case, the multiple light beams enter the deflecting element at angles with respect to each of a deflection surface and a surface that includes a rotation axis of the deflecting element and is orthogonal to the deflection surface. Then, after passing through one or more imaging lenses, the light beams are reflected and separated by a mirror or the like, so that multiple light spots of the light beams simultaneously scan multiple different surfaces to be scanned, respectively.

In this tandem type scanning optical apparatus, when one of scanning optical systems scans using the light beam, the light beam reflected by the lens surface of the imaging lens may enter another scanning optical system on the opposing side with respect to the deflecting element and may reach a surface to be scanned to be light of ghost or light of flare. Japanese Patent Application Laid-Open No. 2002-196269 discloses a case where a tandem type scanning optical apparatus is provided with a light shielding member that shields light of ghost entering a vicinity of the deflecting element from the scanning optical system in the opposing direction. Japanese Patent Application Laid-Open No. 2005-084565 discloses a case where a tandem type scanning optical apparatus is provided with a mirror having a low reflectance (light amount reducing unit) disposed between a scanning optical element closest to the surface to be scanned and the deflecting element, so as to reduce light of ghost generated from the scanning optical element closest to the surface to be scanned.

In the method of reducing light of ghost (light of flare) using the light shielding member as described in Japanese Patent Application Laid-Open No. 2002-196269, the light shielding member disposed in the vicinity of the deflecting element is close to the deflecting element itself or an effective light beam. For this reason, it is difficult to shield the light of ghost completely. In the method of reducing light of ghost using the light amount reducing unit as described in Japanese Patent Application Laid-Open No. 2005-084565, it is possible to reduce light of ghost generated from the scanning optical element closest to the surface to be scanned. However, light of ghost generated from an optical element closer to the deflecting element than the mirror having a low reflectance cannot be reduced.

In the tandem type scanning optical apparatus in which multiple scanning optical systems are disposed to be opposed with respect to the deflecting element, it is important for forming an accurate image to prevent a light beam entering from the opposing side with respect to the deflecting element from becoming light of flare or light of ghost with a simple method. In particular, as for a color image forming apparatus, even if light of ghost slightly enters a photosensitive surface corresponding to an image of a hue having low brightness, for example, a black image, the light of ghost can be visual, with the result that image quality is deteriorated.

SUMMARY OF THE INVENTION

It is an object of the present invention to provide a scanning optical apparatus that can reduce, with a simple unit, light of ghost generated from every optical element of a scanning optical system on an opposing side with respect to a deflecting element, in an optical path corresponding to an image of a hue having low brightness and high visibility of light of ghost.

It is another object of the present invention to provide a color image forming apparatus including the scanning optical apparatus.

There is provided a scanning optical apparatus, including: two light source units; a deflecting unit for deflecting two light beams for scanning emitted from the two light source units by different deflection surfaces; and two imaging optical systems disposed corresponding to the two light beams for scanning deflected by the different deflection surfaces of the deflecting unit, in which the two imaging optical systems form images of the two light beams for scanning deflected by the different deflection surfaces of the deflecting unit on photosensitive members of different hues; the two imaging optical systems are disposed to be opposed with respect to the deflecting unit in a sub-scanning cross section; and a reflectance of a first reflecting optical element disposed in an optical path between the photosensitive member and the deflection surface passed by a light beam corresponding to an image of a hue having low brightness, between the two light beams emitted from the two light source units, is lower than a reflectance of a second reflecting optical element disposed in an optical path between the photosensitive member and the deflection surface passed by a light beam corresponding to an image of a hue having high brightness, between the two light beams emitted from the two light source units.

In the scanning optical apparatus, defining that Rd denotes the reflectance of the first reflecting optical element, and Rb denotes the reflectance of the second reflecting optical element, the following conditional expression is satisfied.

$$1.2 < Rb/Rd < 2.5$$

In the scanning optical apparatus, a light emission amount of the light source unit emitting the light beam corresponding to the image of the hue having the low brightness between the two light beams is larger than a light emission amount of the light source unit emitting the light beam corresponding to the image of the hue having the high brightness between the two light beams.

There is provided a scanning optical apparatus, including: two light source units; a deflecting unit for deflecting two light beams for scanning emitted from the two light source units by different deflection surfaces; and two imaging optical systems disposed corresponding to the two light beams for scanning deflected by the different deflection surfaces of the deflecting unit, in which the two imaging optical systems form images of the two light beams for scanning deflected by the different deflection surfaces of the deflecting unit on photosensitive members of different hues; the two imaging optical systems are disposed to be opposed with respect to the deflecting unit in a sub-scanning cross section; when, defining that $LV_0$ denotes a light amount of the light beam for scanning deflected by the deflection surface of the deflecting unit, LV denotes a light amount of the light beam for scanning deflected by the deflection surface of the deflecting unit entering the photosensitive member, and LT denotes an optical efficiency, $LT=LV/LV_0$ is established; and a first optical efficiency of an optical path between the photosensitive member and the deflection surface passed by a light beam corresponding to an image of a hue having low brightness, between the two light beams emitted from the two light source units, is lower than a second optical efficiency of an optical path between the photosensitive member and the deflection surface passed by a light beam corresponding to an image of a hue having high brightness, between the two light beams emitted from the two light source units.

In the scanning optical apparatus, the hue having the low brightness includes black.

In the scanning optical apparatus, defining that Ed denotes the first optical efficiency, and Eb denotes the second optical efficiency, the following conditional expression is satisfied.

$$1.2 < Eb/Ed < 2.5$$

In the scanning optical apparatus, each of the two imaging optical systems includes an imaging lens made of a plastic material having an optical surface on which antireflection layer is not formed.

There is provided a color image forming apparatus, including the above-mentioned scanning optical apparatus; and two photosensitive members of hues having different brightnesses.

According to the present invention, it is possible to obtain the scanning optical apparatus that can reduce, with a simple unit, the light of ghost generated from every optical element of the scanning optical system on an opposing side with respect to the deflecting element, in the optical path corresponding to the image of the hue having low brightness and high visibility of light of ghost.

Further features of the present invention will become apparent from the following description of exemplary embodiments with reference to the attached drawings.

DESCRIPTION OF THE EMBODIMENTS

Hereinafter, an exemplary embodiment of the present invention is described in detail with reference to the attached drawings. A scanning optical apparatus of the present invention deflects light beams from multiple light source units for scanning by a single deflecting element. Then, the light beams are guided by imaging optical systems disposed for the individual light source units to surfaces to be scanned having photosensitive units disposed thereon for forming different images having different brightnesses of yellow, magenta, cyan and black.

The imaging optical systems are disposed to be opposed with respect to a deflecting element. Among light beams from the multiple light source units, a light beam corresponding to an image of a hue having low brightness (for example, black image) and a light beam corresponding to an image of a hue having high brightness (for example, yellow image) are reflected and deflected by different deflection surfaces of the deflecting element in opposing directions with respect to the deflecting element. Here, the brightness of the image of a hue having low brightness is lowest among brightnesses of all images. The brightness of the image of a hue having high brightness is highest among brightnesses of all images.

The multiple light beams reflected and deflected by the deflecting element are respectively guided to the surfaces to be scanned by the imaging optical systems. An optical efficiency Ed from the deflecting element to the surface to be scanned of the optical path corresponding to the image of a hue having low brightness is set to be lower than an optical efficiency Eb from the deflecting element to the surface to be scanned of the optical path corresponding to the image of a hue having high brightness. In other words, Ed<Eb is satisfied.

Here, the optical efficiency LT is expressed by $LT=LV/LV_0$, where $LV_0$ denotes a light amount of the light beam reflected and deflected by the deflecting element, and LV denotes a light amount of light entering the surface to be scanned.

Embodiment 1

Figure 1:
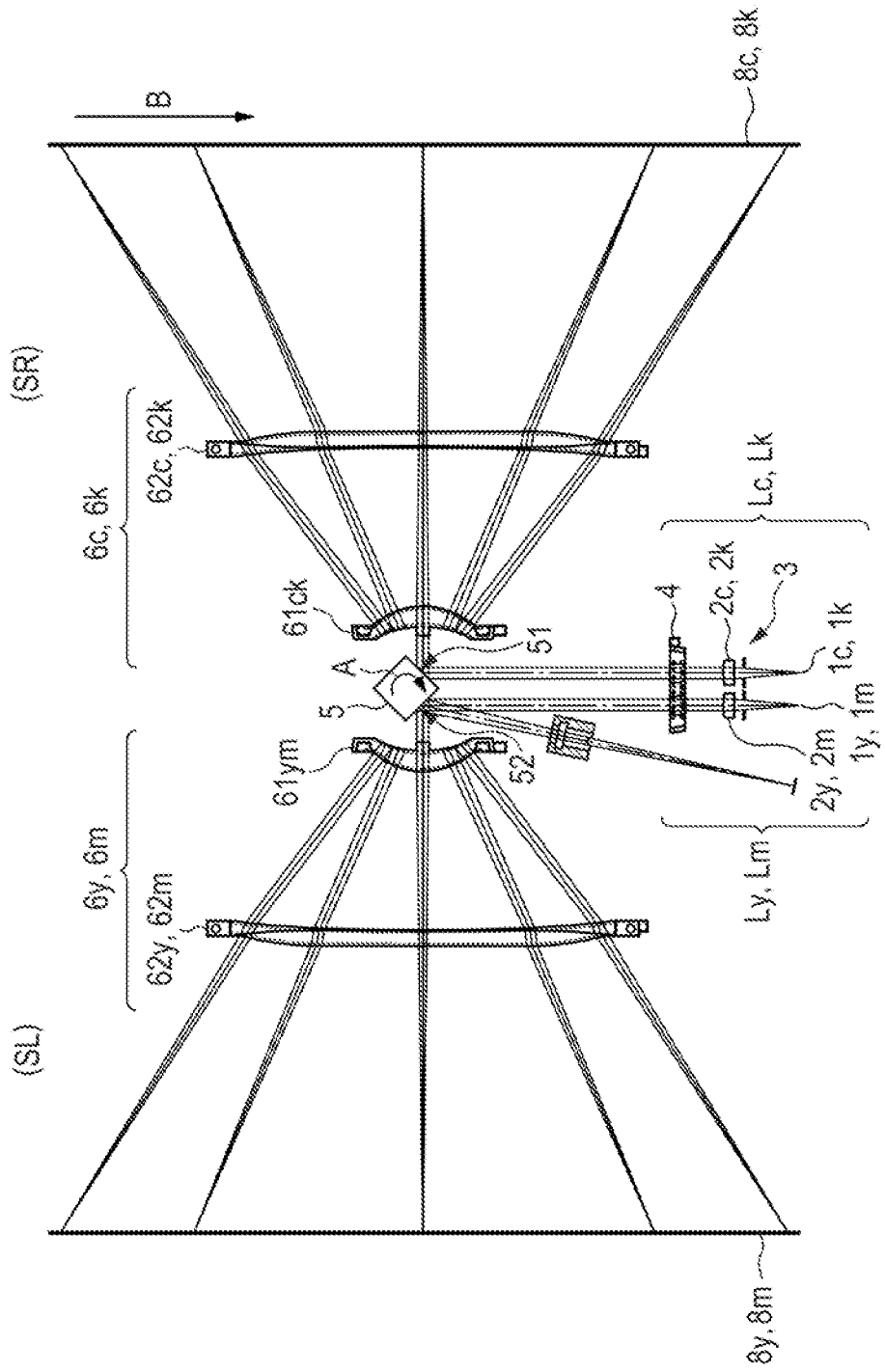
FIG. 1 is a main scanning cross sectional view of a scanning optical apparatus of Embodiment 1.
Figure 2:
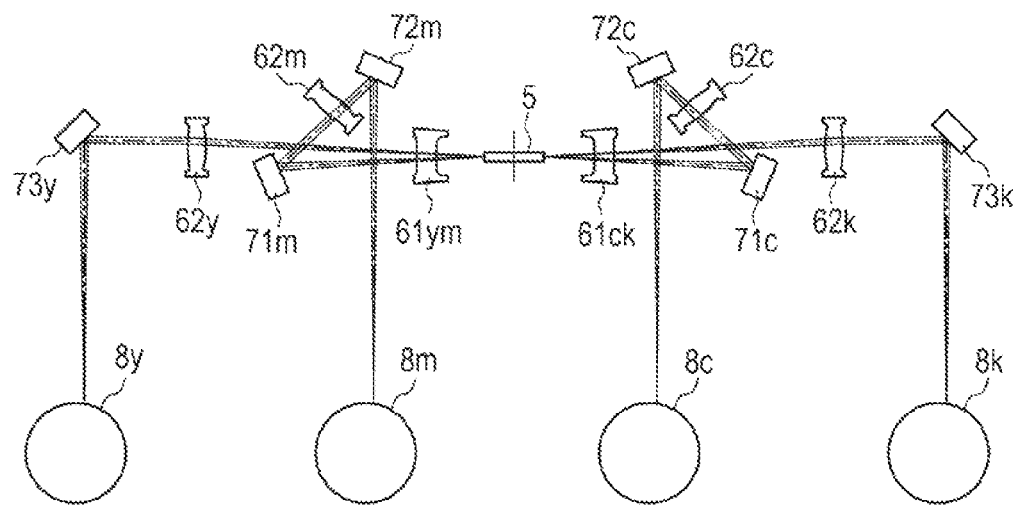
FIG. 2 is a sub-scanning cross sectional view of the scanning optical apparatus of Embodiment 1.

FIG. 1 is a cross sectional view of a main part of a tandem type scanning optical apparatus of Embodiment 1 of the present invention in a main scanning direction (main scanning cross sectional view). FIG. 2 is a cross sectional view of the main part of the tandem type scanning optical apparatus of Embodiment 1 of the present invention in a sub-scanning direction (sub-scanning cross sectional view). Note that, in the following description, the main scanning direction (Y direction) means a direction in which the light beam for scanning is deflected by a deflecting unit. The sub-scanning direction (Z direction) means a direction parallel to a rotation axis of the deflecting unit. The main scanning cross section means a plane whose normal is the rotation axis of the deflecting unit. The sub-scanning cross section means a plane whose normal is an axis in the main scanning direction. In addition, in this specification and the drawings, a suffix x represents y (yellow), m (magenta), c (cyan) or k (black) corresponding to hues. In addition, y to k means y, m, c and k.

In FIG. 1, light source units 1y to 1k (hereinafter, sometimes simply referred to as "light source unit 1") each include at least one light emission portion (light emission point) constituted of a semiconductor laser, for example. An aperture stop 3 restricts a light beam (light amount) passing therethrough. Collimator lenses 2y to 2k (hereinafter, sometimes simply referred to as "collimator lens 2") convert the multiple light beams emitted from corresponding multiple light source units 1y to 1k to enter the collimator lenses 2y to 2k into collimated light beams or substantially collimated light beams, which are then emitted. A cylindrical lens 4 has a function of converting the light beams from the collimator lenses 2y to 2k into line images extending in the main scanning direction on deflection surfaces 51 and 52 of a deflecting element 5.

Note that, the collimator lens 2 and the cylindrical lens 4 may be constituted of a single anamorphic lens. The aperture stop 3, the collimator lenses 2y to 2k, and the cylindrical lens 4 constitute incident optical systems (condensing optical systems) Ly to Lk (hereinafter, sometimes simply referred to as "incident optical system L"). The deflecting element 5 is constituted of a rotation polygon mirror having multiple deflection surfaces and is rotated at a constant speed in a direction of an arrow A by a driving unit such as a motor so as to reflect and deflect the light beams from the incident optical systems Ly to Lk. Scanning optical systems SR and SL (scanning units) are disposed to be opposed to each other with respect to the deflecting element 5.

Imaging optical systems 6y to 6k (hereinafter, sometimes simply referred to as "imaging optical system 6") having an fθ characteristic has different refractive powers between the main scanning direction and the sub-scanning direction, and form images of the multiple light beams from the deflecting element 5 on surfaces to be scanned 8y to 8k (hereinafter, sometimes simply referred to as "surface to be scanned 8") respectively corresponding to the light beams. Imaging lenses 61ym and 61ck (hereinafter, sometimes simply referred to as "imaging lens 61") and 62y to 62k (hereinafter, sometimes simply referred to as "imaging lens 62") as imaging optical elements, which constitute the imaging optical systems 6y to 6k in this embodiment, are formed as toric lenses made of a plastic material. Antireflection layer is not applied (added) to the surfaces of the toric lenses 61 and 62.

The imaging optical systems 6c and 6k on the scanning optical system SR side respectively have the common first imaging lens 61ck and the second imaging lenses 62c and 62k. The imaging optical systems 6y and 6m on the scanning optical system SL side respectively have the common first imaging lens 61ym and the second imaging lenses 62y and 62m. The imaging optical systems 6y to 6k form images of the light beams, which are based on image information and deflected for scanning by the deflecting element 5, on the corresponding photosensitive drum surfaces 8y to 8k as the surfaces to be scanned. In addition, the imaging optical systems 6y to 6k perform optical face tangle error compensation of the deflection surfaces 51 and 52 by setting a conjugate relationship between the deflection surfaces 51 and 52 of the deflecting element 5 and the photosensitive drum surface 8y to 8k in the sub-scanning cross section.

Mirrors (reflective mirrors) 73k, 71c and 72c are reflecting elements on the scanning optical system SR side and bend optical paths in the scanning optical system SR. Mirrors (reflective mirrors) 73y, 71m and 72m are reflecting elements on the scanning optical system SL side and bend optical paths in the scanning optical system SL. The photosensitive drum surfaces 8k and 8c are surfaces to be scanned on the scanning optical system SR side. The photosensitive drum surfaces 8y and 8m are surfaces to be scanned on the scanning optical system SL side.

In this embodiment, one or more reflecting elements are disposed in each of the optical paths to the multiple surfaces to be scanned 8y to 8k. A dust proof glass (not shown) is respectively disposed between the imaging optical unit 6y to 6k and the surface to be scanned 8y to 8k and prevents dust from entering the scanning optical apparatus. The scanning optical apparatus of this embodiment guides the light beams emitted from the light emission portions of the four light source units 1y to 1k to the four different surfaces to be scanned 8y to 8k to scan the surfaces to be scanned 8y to 8k optically. Hereinafter, for simple description, the optical path of the light beam emitted from one light source unit 1k is described in the description of function of the scanning optical apparatus.

The diverging light beam emitted from the semiconductor laser 1k as the light source unit is restricted in its light amount by the aperture stop 3 and enters the corresponding collimator lens 2k. The light beam from the collimator lens 2k is condensed by the cylindrical lens 4 and is converted into a collimated light beam with respect to the main scanning cross section (in the main scanning direction) and forms an image elongated in the sub-scanning cross section (in the sub-scanning direction) on the deflection surface 51 of the deflecting element 5. In the sub-scanning cross section, the light beam from the incident optical system Lk enters the deflection surface 51 at an angle.

The light beam entering the deflecting element 5 is deflected for scanning by the deflection surface 51 in the direction of the surface to be scanned and enters the imaging optical system 6k. In this embodiment, the imaging optical system 6k includes the first toric lens (imaging lens) 61ck made of a plastic material having power mainly in the main scanning direction and the second toric lens (imaging lens) 62k made of a plastic material having power mainly in the sub-scanning direction. In addition, the imaging optical system 6k forms an image of the deflected light beam from the deflection surface 51 on the surface to be scanned 8k and compensates for an optical face tangle error among the multiple deflection surfaces 51.

The first toric lens 61ck in this embodiment is used in common between the two imaging optical systems 6c and 6k as described above. Note that, the form and the method of forming the imaging optical system 6k are not limited to those described above. The light beam forming an image on the surface to be scanned 8k by the imaging optical system 6k is deflected for scanning at a constant angular velocity in the direction of an arrow B (main scanning direction) on the surface to be scanned 8k by rotation of the polygon mirror fixed to a motor shaft (not shown) in the direction of the arrow A.

The scanning optical apparatus in this embodiment is the tandem type scanning optical apparatus that has four of the scanning functions so as to record pieces of image information corresponding to different hues simultaneously on the different surfaces to be scanned, which is described in detail as follows. The four light source units 1y to 1k in this embodiment are disposed in the main scanning direction and in the sub-scanning direction in a rectangular shape. Among those, the light beams from the light source units 1c and 1k enter the deflection surface 51 of the deflecting element 5, and the light beams from the light source units 1y and 1m enter the deflection surface 52 of the optical deflector 5, so as to separate the light beams to the left and the right of the deflecting element 5.

Further, the light beams from the light source units 1c and 1k enter the optical deflector 5 obliquely at different incident angles in the sub-scanning cross section, so as to be separated in space by the mirror 71c disposed after the first toric lens 61ck. The same is true for the light beams from the light source units 1y and 1m.

In this way, the multiple light beams having different oblique incident angles in the sub-scanning cross section with respect to the deflecting element 5 enter the two different deflection surfaces 51 and 52 of the deflecting element 5, and hence the single deflecting element 5 can simultaneously scan using the four light beams. The light beams from the light source units 1y and 1k directed to the surfaces to be scanned 8y and 8k on the side physically farthest from the deflecting element 5 are deflected for scanning by the deflecting element 5, and then are deflected by the individual reflecting elements (mirrors) 73y and 73k to be guided to the respective surfaces to be scanned 8y and 8k.

On the other hand, the light beams from the light source units 1m and 1c directed to the surface to be scanned 8m and 8c on the side physically closest to the deflecting element 5 are deflected for scanning by the deflecting element 5. After that, the light beams are deflected by two reflecting elements (mirrors) 71m and 72m (71c and 72c) to be guided to the respective surfaces to be scanned 8m and 8c.

In FIG. 2, the photosensitive drum 8k and the photosensitive drum 8c may be exchanged. Further, in the same manner, the photosensitive drum 8y and the photosensitive drum 8m may be exchanged. The four light beams correspond to black (K), and yellow (Y), magenta (M) and cyan (C) as three primary colors for forming a full color image by subtractive mixture, and the four light beams record image information on the photosensitive drums disposed on the surfaces to be scanned.

In this embodiment, the photosensitive drums corresponding to the four colors are disposed in order of Y, M, C and K from the left of FIG. 2, in which the optical path of K (black) as a hue having the lowest brightness and the optical path of Y (yellow) as a hue having the highest brightness are opposed to each other with respect to the deflecting element 5. Note that, the photosensitive drums may be disposed in order of M, Y, K and C.

First, opposing ghost is described. Here, light of ghost caused by surface reflection by the imaging optical systems 6y to 6k is described. Antireflection layer is not added to the surface (light incident and exit surface) of the toric lens made of a plastic material as described above. This is because that vapor deposition onto a plastic lens is difficult compared with that onto a glass lens. Therefore, approximately 4% of the light beam is reflected by the lens surface although it depends on an incident angle of the light beam and the deflection direction.

Figure 3:
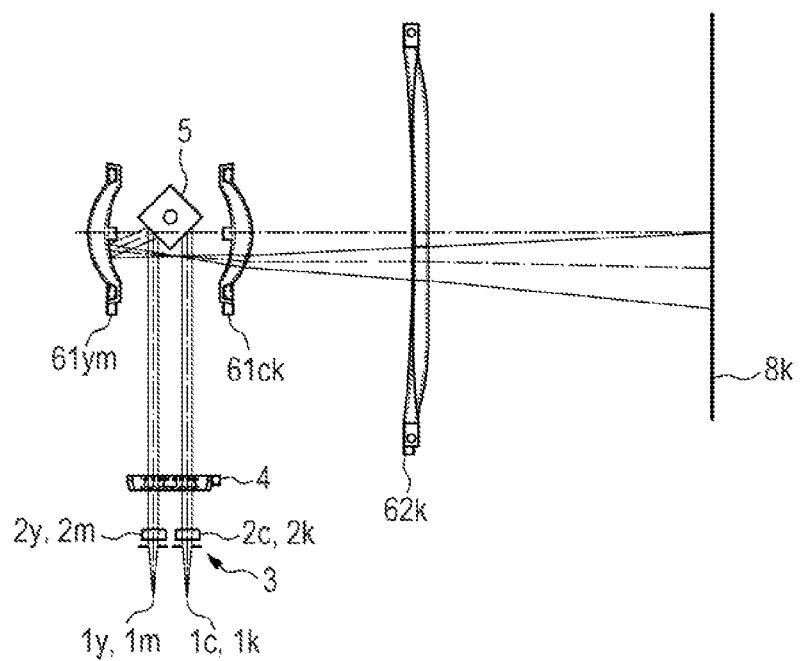
FIG. 3 is a main scanning cross sectional view illustrating light of ghost from a Y optical path to a K optical path in the scanning optical apparatus of Embodiment 1.
Figure 4:
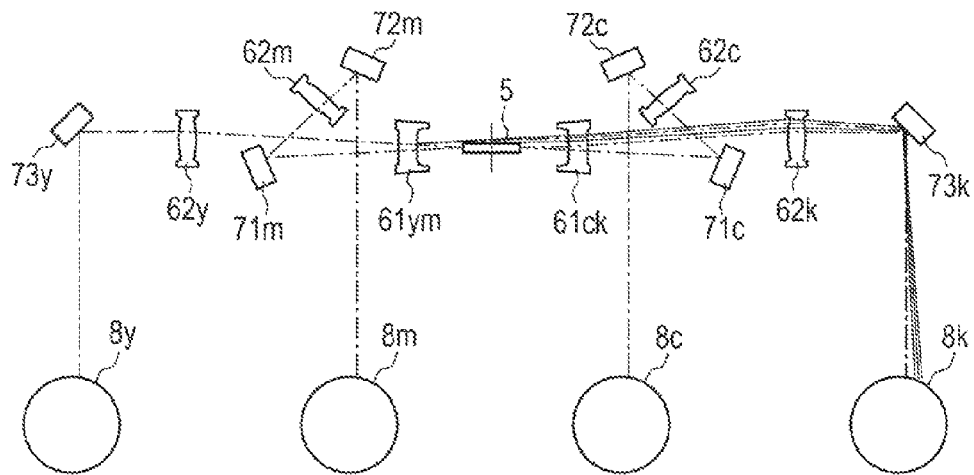
FIG. 4 is a sub-scanning cross sectional view illustrating the light of ghost from the Y optical path to the K optical path in the scanning optical apparatus of Embodiment 1.

FIGS. 3 and 4 are explanatory diagrams illustrating light of ghost generated from a surface R1 as a first lens surface of the toric lens 61ym on the Y optical path side of the scanning optical apparatus of this embodiment. FIG. 3 is a main scanning cross sectional view, and FIG. 4 is a sub-scanning cross sectional view. The light beam reflected by the lens surface of the toric lens passes above the deflecting element 5 and reaches a vicinity of the surface to be scanned 8k in the K optical path via the toric lenses 61ck and 62k, and the reflective mirror 73k on the K optical path side, and then becomes light of ghost. Such light of ghost mixing into the optical path corresponding to another hue is apt to cause a change of tint of the image and has high visibility. Note that, here in this embodiment, the ghost from the Y optical path to the K optical path is described, but the same is true for ghost from the K optical path to the Y optical path.

Figure 5:
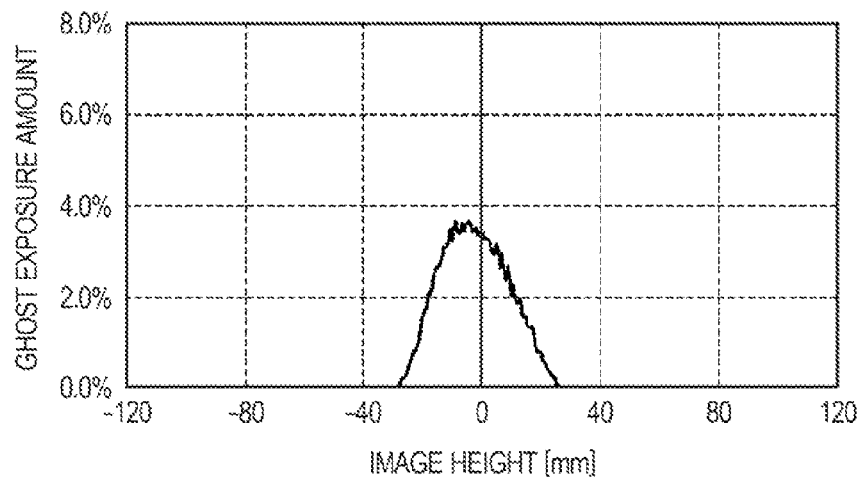
FIG. 5 is a diagram illustrating a ghost exposure amount on a surface to be scanned on the K optical path side in a scanning optical apparatus of a comparative example.

Here, a comparative example of this embodiment is described concerning light of ghost in which a reflectance of the reflecting element in the Y optical path is set to be the same as that in the K optical path. FIG. 5 shows a light amount of ghost of the surface to be scanned on the K optical path side when the toric lens 61ym is assembled obliquely by 30 degrees with respect to the optical axis in the comparative example, which is normalized by the light amount of the image writing light beam on the K optical path side. As understood from FIG. 5, in this embodiment, the light of ghost from the toric lens 61ym in the Y optical path is generated by approximately 3.6% in the vicinity of the center of the image, which causes uneven image surface illuminance and deteriorates image quality particularly in a halftone image.

Figure 6:
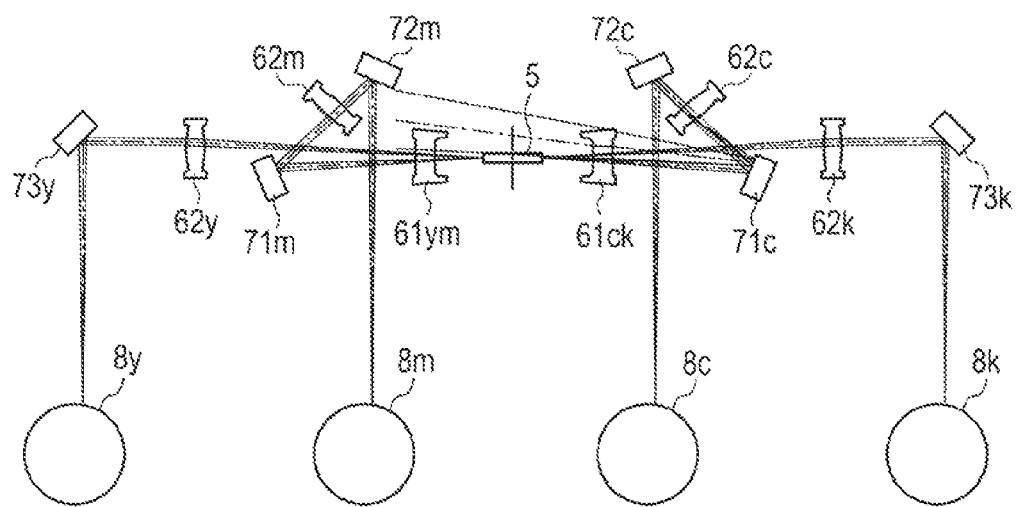
FIG. 6 is a sub-scanning cross sectional view illustrating light of ghost from a C optical path to the Y optical path in the scanning optical apparatus of Embodiment 1.

FIG. 6 is a diagram illustrating light of ghost from a surface R2 as a second lens surface of the toric lens 62c on the C optical path side toward the Y optical path in the scanning optical apparatus of this embodiment. This ghost also reaches the opposing side with respect to the deflecting element 5 and causes image deterioration in the same manner as the ghost from the toric lens 61ym.

Note that, it is considered that the light of ghost does not reach the surface to be scanned on the opposing side if the optical system is disposed at a normal position in design depending on a structure and arrangement of the scanning optical apparatus. However, in this case too, it cannot be denied that ghost may be generated due to an assembling error or the like of the optical element as a ghost source. Therefore, in this case too, the effect of the present invention can be obtained, and the scope of the present invention is not limited.

Hereinafter, a relationship between optical efficiency and light of ghost is described. The optical efficiency of the tandem type scanning optical apparatus is usually set to be uniform among optical paths corresponding to individual hues. On the other hand, in this embodiment, reflectances of the reflecting elements or transmittances of the optical elements disposed at substantially optically symmetrical positions are changed depending on the optical path.

Specifically, the reflectance of the reflecting element 73y disposed in the optical path of the hue Y having the highest brightness is set to 90%, and the reflectance of the reflecting element 73k disposed in the optical path of the hue K having the lowest brightness is set to 45%. Through this setting, the light amount of ghost to the hue K having low brightness and high visibility of ghost is lower than the light amount of ghost to the hue Y having high brightness and low visibility of ghost. The reason why the light amount of ghost changes through the setting of the optical efficiency in each optical path is described from the following two points.

As a first point, a change of the surface reflection light amount due to an incident light amount difference is described. Table 1 is a table showing a light amount balance in the optical paths corresponding to the hues Y and K in this embodiment. For simple description, it is supposed that reflectances of the reflecting elements of the hues Y and K are 1 and 0.5, respectively, and elements having no difference between the optical paths in the scanning optical system are omitted because the elements have no influence on the discussion.

First, the image writing light amount needs to be uniform among the surfaces to be scanned in the individual optical paths. Therefore, calculation is performed from the surface to be scanned as a base point backward to the light source side. As described above, the reflectances of the reflecting elements in the optical paths corresponding to the hues Y and K have a relationship of 1:0.5. Therefore, amounts of incident light to the deflecting elements 5 have a relationship of 1:2. Here, as understood from FIG. 4, the ghost reaching the surface to be scanned 8$k$ of the K optical path is generated in the Y optical path, and the ghost reaching the surface to be scanned 8$y$ of the Y optical path is generated in the K optical path.

Thus, light amounts of surface reflection by the toric lenses 61 as ghost sources have a relationship of 2:1 in an opposite manner. In other words, the light amount of ghost that is to reach the surface to be scanned 8$k$ on the K optical path side is reduced to a half when the ghost is generated.

TABLE 1

| | | High brightness Y | Low brightness Bk | Ratio Bk/Y |
|---|---|---|---|---|
| Image writing light | Light amount on surface to be scanned | 1 | 1 | 1 |
| | Reflectance of reflecting element | 1 | 0.5 | 0.5 |
| | Incident light amount to deflecting element | 1 | 2 | 2 |
| Light of ghost | Reflection light amount by toric lens surface | 2 | 1 | 0.5 |
| | Reflectance of reflecting element | 1 | 0.5 | 0.5 |
| | Light amount on surface to be scanned | 2 | 0.5 | 0.25 |

As a second point, a change of the light amount due to an optical efficiency difference of the path for light of ghost is described. The light of ghost generated by the toric lens 61 passes above the deflecting element 5 and passes through all the optical elements on the opposing side to reach the surface to be scanned. Because reflectances of the reflecting elements in the optical paths corresponding to the hues Y and K have the relationship of 1:0.5 as described above, the lights of ghost reaching the surfaces to be scanned have a relationship of Y:K=2:0.5. Therefore, it is possible to relatively reduce the light amount of ghost on the K optical path side having high visibility of ghost.

In this way, optical efficiencies of the Y optical path having high brightness and the K optical path having low brightness are set appropriately. Thus, there is a difference in light amount between light beams entering the ghost generating surfaces, and further, optical efficiency of transmitting the generated light of ghost to the surface to be scanned is changed. By synergistic effect of them, a ratio between the lights of ghost in the optical paths can be changed.

Note that, in this embodiment, the above-mentioned effect is obtained by making a difference of the reflectance of the reflecting element (mirror) disposed in the optical path between hues, but a light amount reduction unit such as a filter may be disposed in the optical path, or an optical thin layer may be formed on the surface of the optical element so as to reduce the light amount. In other words, it is important to set the optical efficiency from the deflecting element 5 to the surface to be scanned in the optical path corresponding to an image of the hue K having low brightness to be lower than that in the optical path corresponding to an image of the hue Y having high brightness.

Hereinafter, the setting range of the optical efficiency is described. As understood from the above-mentioned discussion, when the optical efficiency of the optical element is changed for each hue, both the image writing light beam and the ghost light beam are affected. This is expressed by the relationship of the following expressions.

The optical efficiency from the deflecting element 5 to the surface to be scanned in the optical path corresponding to a black image of the hue having low brightness is denoted by Ed. The optical efficiency from the deflecting element 5 to the surface to be scanned in the optical path corresponding to a yellow image of the hue having high brightness is denoted by Eb. The light amount of ghost on the surface to be scanned in the optical path corresponding to an image of a hue having low brightness is denoted by Gd. The light amount of ghost on the surface to be scanned in the optical path corresponding to an image of a hue having high brightness is denoted by Gb. In this case, the following expression holds.

$$Gb/Gd = (Eb/Ed)^2 = 4.0 \quad (1)$$

According to the expression (1), when the ratio of the optical efficiency between hues is increased, a ratio of the light amount of ghost between the hues increases in proportion to the square of the ratio of the optical efficiency. However, if the ratio of the optical efficiency is increased too much, incident light amount to the deflecting element 5 changes in proportion to the ratio of the optical efficiency. Therefore, from a viewpoint of laser light emission amount, if the ratio of the optical efficiency between hues is greater than 2.5, it is difficult to use the same light source and collimator lens between hues.

Further, because the light amount of ghost on the Y optical path side is relatively increased, ghost becomes conspicuous even in a case of the hue having low visibility of ghost. In addition, if the ratio of the optical efficiency between colors is lower than 1.2, it is difficult to achieve the object of this embodiment, namely to relatively reduce light of ghost in the optical path corresponding to an image of a hue having low brightness and high visibility.

In this embodiment, if there is light of ghost even slightly in the hue Bk, the light of ghost can be readily viewed. In other words, the visibility of ghost is high. Therefore, the optical efficiency is set between optical paths so that the light amount of ghost to the hue Bk becomes smaller than that to the hue Y. In other words, Ed<Eb is satisfied. As described above, in this embodiment, the ratio of the optical efficiency between hues is set as expressed by the following conditional expression.

$$1.2 < Eb/Ed < 2.5 \quad (2)$$

In addition, when the optical efficiency is controlled by the reflectance of the reflecting element, it is necessary to set the reflectance so as to satisfy the following expression.

$$1.2 < Rb/Rd < 2.5 \quad (3)$$

where Rd denotes a product of reflectances of all the reflecting elements disposed between the scanning optical element closest to the deflecting element 5 and the surface to be scanned in the optical path corresponding to an image of the hue k having low and Rb denotes a product of reflectances of all the reflecting elements disposed between the scanning optical element closest to the deflecting element and the surface to be scanned in the optical path corresponding to an image of the hue Y having high brightness. Note that, if multiple (two or more) reflecting elements are disposed in the same optical path, light of ghost is reduced from the reflecting element closer to the surface to be scanned. Therefore, it is desirable to set the reflectance of the reflecting element 71$c$ closest to the deflecting element 5 to be lower than that of another reflecting element 72c disposed in the same optical path. This corresponds to the case where, in FIG. 2, the photosensitive drum 8k and the photosensitive drum 8c are exchanged, and the photosensitive drum 8y and the photosensitive drum 8m are exchanged.

Figure 7:
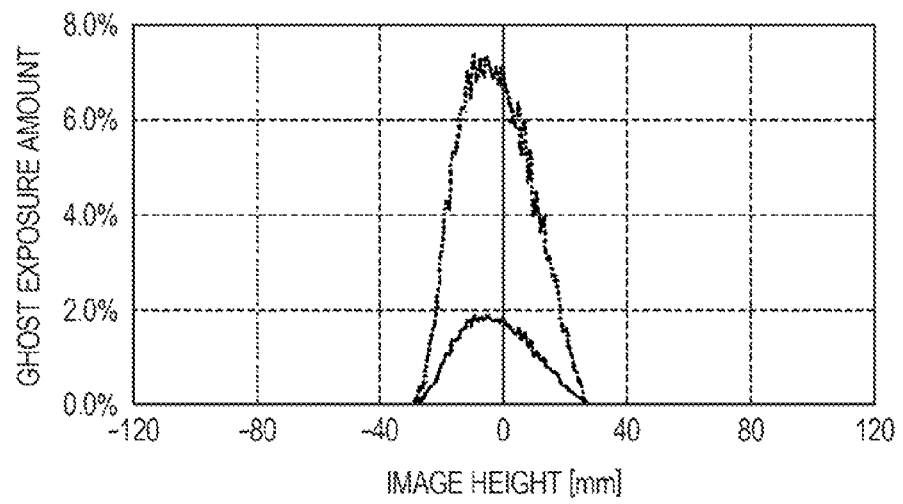
FIG. 7 is a diagram illustrating a ghost exposure amount on the surface to be scanned of the K optical path side in the scanning optical apparatus of Embodiment 1.

In this embodiment, reflectances of the reflecting elements are set so that Eb/Ed=Rb/Rd=0.90/0.45=2.0 is satisfied, and the object of the present invention is achieved without harmful effects. FIG. 7 illustrates light amounts of the lights of ghost on the surfaces to be scanned on the Y optical path side and the K optical path side in this embodiment, in which the solid line corresponds to the K optical path while the broken line corresponds to the Y optical path. Note that, the light amounts of ghost are normalized by an exposure amount of each image writing light beam. FIG. 7 illustrates that by setting the optical efficiencies in the Y and K optical paths as described above, a ratio of the light amount of ghost between the optical paths is changed as expressed by the expression (1).

Figure 10:
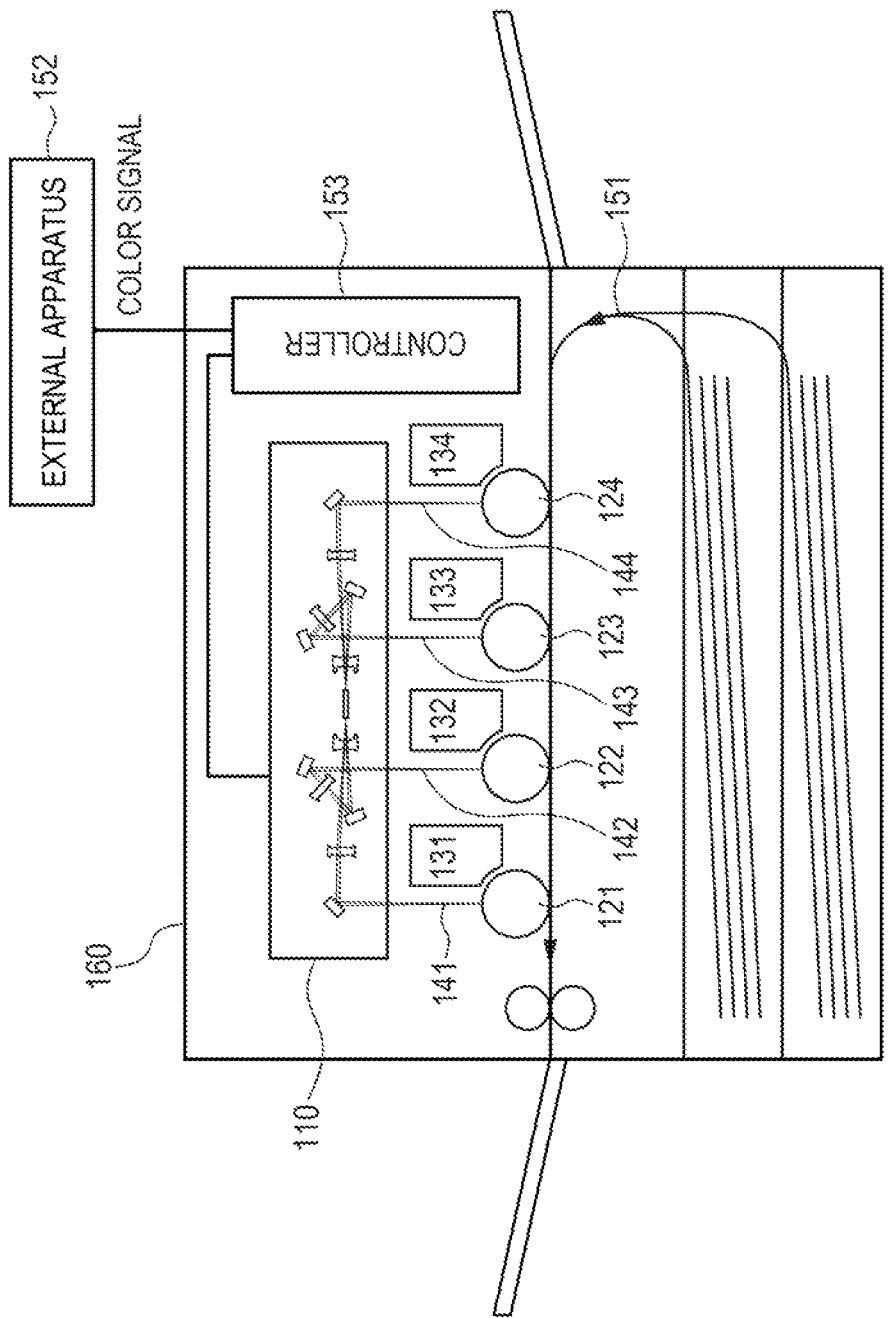
FIG. 10 is a schematic diagram of a main part of a color image forming apparatus of the present invention.

Hereinafter, an image forming apparatus including the scanning optical apparatus is described. FIG. 10 is a schematic diagram of a main part of a color image forming apparatus according to the present invention. The image forming apparatus of this embodiment includes the scanning optical apparatus described above, a photosensitive member disposed on the surface to be scanned, and a developing unit for developing a toner image from an electrostatic latent image formed on the photosensitive member by the light beam for scanning of the scanning optical apparatus. Further, the image forming apparatus includes a transferring unit for transferring the developed toner image onto a transfer material, and a fixing unit for fixing the transferred toner image onto the transfer material.

In FIG. 10, a color image forming apparatus 160 includes a scanning optical apparatus 110 which has the structure described above in this embodiment, photosensitive drums 121, 122, 123 and 124 as image bearing members, developing units 131, 132, 133 and 134, and a conveying belt 151. In FIG. 10, the color image forming apparatus 160 is supplied with red (R), green (G) and blue (B) color signals from an external apparatus 152 such as a personal computer. Those color signals are converted into cyan (C), magenta (M), yellow (Y) and black (B) image data (dot data) by a printer controller 153 in the apparatus.

Those pieces of image data are supplied to the scanning optical apparatus 110. Then, the scanning optical apparatus 110 emits light beams 141, 142, 143 and 144 modulated in accordance with individual pieces of image data, and the light beams scan the photosensitive surfaces of the photosensitive drums 121, 122, 123 and 124 in the main scanning direction.

As described above, the color image forming apparatus of this embodiment uses the four light beams based on the individual pieces of image data from the scanning optical apparatus 110 so as to form latent images of individual colors on the surfaces of the corresponding photosensitive drums 121, 122, 123 and 124. After that, the latent images are transferred and overlaid onto a record material one on another so as to form a single full color image. As the external apparatus 152, a color image reading apparatus including a CCD sensor may be used, for example. In this case, this color image reading apparatus and the color image forming apparatus 160 constitute a color digital copying machine.

As described above, in this embodiment, the optical paths corresponding to hues having different brightnesses are arranged so as to be deflected in the opposing directions with respect to the deflecting element by the different deflection surfaces of the deflecting element, and optical efficiencies of the optical paths are set appropriately. Thus, in the tandem type scanning optical apparatus, light of ghost in the optical path corresponding to an image of the hue having low brightness and high visibility from all the optical elements on the opposing side with respect to the deflecting element can be relatively reduced. In addition, image surface illuminance distribution can be uniform on the surface to be scanned by a simple method, and it is possible to provide the scanning optical apparatus that is suitable for high definition printing and the image forming apparatus including the scanning optical apparatus. Note that, the exemplary embodiment of the present invention is described above, but the present invention is not limited to the embodiment, and various modification and changes can be made thereto within the scope of the sprit thereof.

Embodiment 2

Figure 8:
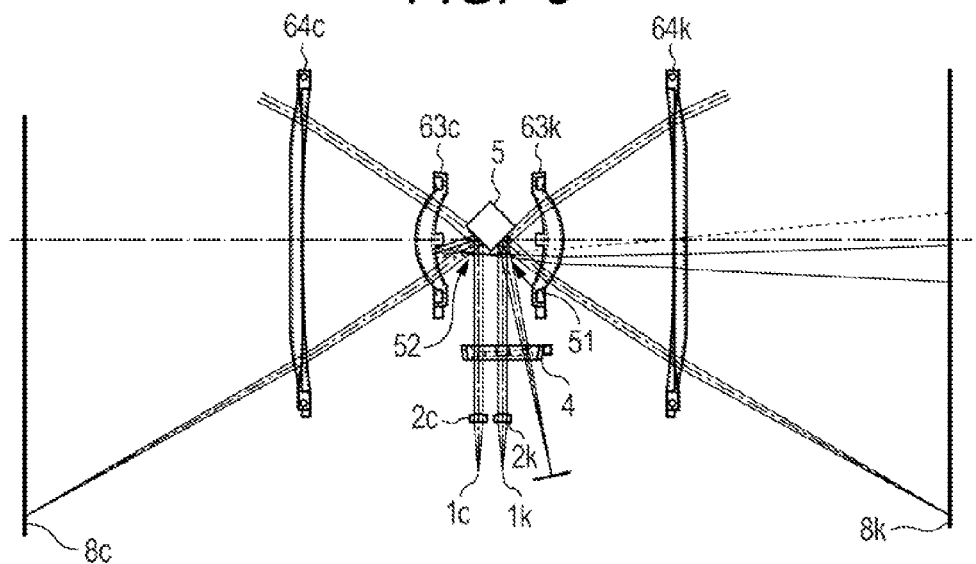
FIG. 8 is a diagram illustrating a main scanning cross section of a scanning optical apparatus of Embodiment 2 and the light of ghost from the Y optical path to the K optical path.
Figure 9:
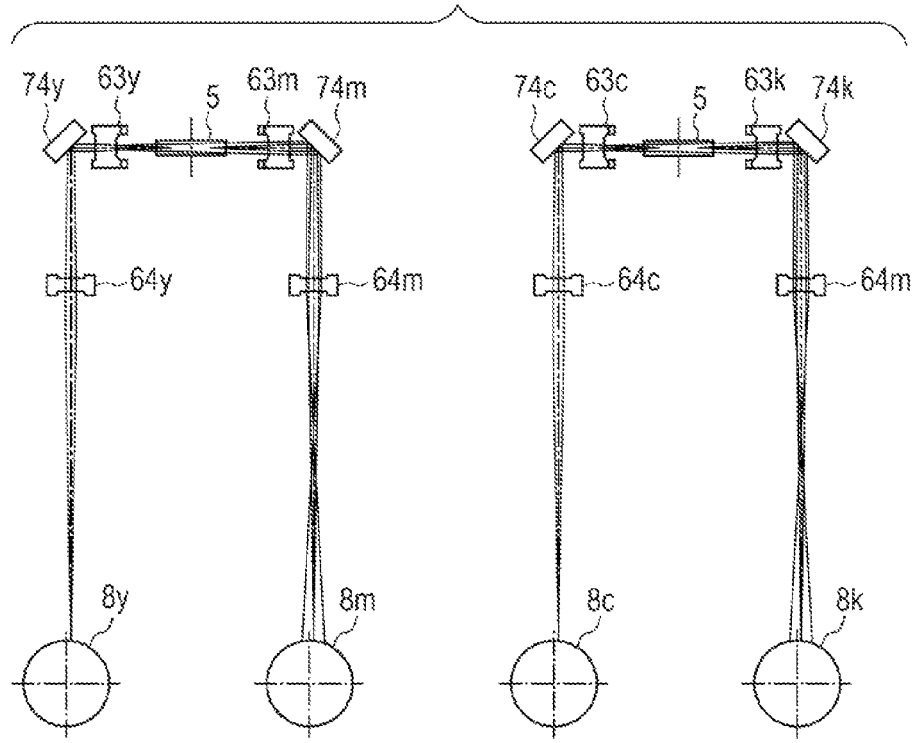
FIG. 9 is a diagram illustrating a sub-scanning cross sectional view of the scanning optical apparatus of Embodiment 2 and the light of ghost from the Y optical path to the K optical path.

FIG. 8 is a cross sectional view of a main part of a scanning optical apparatus of Embodiment 2 of the present invention in the main scanning direction, and FIG. 9 is a cross sectional view of the main part in the sub-scanning direction. Embodiment 2 is different from Embodiment 1 in that the single deflecting element 5 scans two surfaces to be scanned, and two deflecting elements 5 are linked to form a single scanning optical apparatus, and therefore in that the light beam from the light source entering the deflecting element 5 does not have an angle in the sub-scanning cross section. Other points than that are the same as in Embodiment 1.

In this embodiment too, similarly to Embodiment 1, the light beam reflected by an optical surface of a toric lens 63c enters the opposing optical path with respect to the deflecting element 5 and reaches the vicinity of the surface to be scanned 8k via toric lenses 63k and 64k to be light of ghost. In addition, unlike Embodiment 1, in this embodiment, the light beam from the light source entering the deflecting element 5 is so-called in-deflection-surface incident light having no angle in the sub-scanning cross section. Therefore, the image writing light beam and the ghost light beam are overlapped in space, and hence it is difficult to mechanically shield the light of ghost from the sub-scanning direction.

As illustrated in FIG. 9, in this embodiment, the photosensitive drums corresponding to four colors are arranged in order of C, M, Y and K from the left of FIG. 9. The optical path of black (K) as the hue having lowest brightness and the optical path of cyan (C) as the hue having relatively high brightness are disposed to be opposed with respect to the deflecting element 5. In addition, the optical path of yellow (Y) as the hue having highest brightness and the optical path of magenta (M) as the hue having relatively low brightness are disposed to be opposed with respect to the deflecting element 5.

In this case, the reflectances of the reflecting elements in the optical paths corresponding to images of a hue having relatively low brightness (k and m) are set to be lower than the reflectances of the reflecting elements in the optical paths corresponding to images of a hue having relatively high brightness (c and y). Specifically, the reflectances of reflecting elements 74k and 74m disposed in the K optical path and the M optical path is set to 60%, and the reflectances of reflecting elements 74y and 74c disposed in the Y optical path and the C optical path is set to 90%.

Therefore, in this embodiment, Eb/Ed=Rb/Rd=0.90/0.60=1.5 is satisfied. The expressions (2) and (3) in Embodiment 1 are satisfied in the setting, and hence the object of the present invention is achieved without harmful effects.

As a result, from the same reason as in Embodiment 1, light of ghost of the hue having low brightness and high visibility of ghost can be reduced relative to light of ghost of the hue having high brightness. In addition, a ratio of the light amount of ghost between them is expressed as $Gb/Gd=(Eb/Ed)^2=2.25$ from the expression (1).

As described above, in this embodiment too, optical paths corresponding to hues having different brightnesses are arranged so as to be deflected in the opposing directions with respect to the deflecting element by the different deflection surfaces of the deflecting element, and optical efficiencies of the optical paths are set appropriately. Thus, in the tandem type scanning optical apparatus, light of ghost in the optical path corresponding to an image of the hue having low brightness and high visibility from all the optical elements on the opposing side with respect to the deflecting element can be relatively reduced. In addition, image surface illuminance distribution can be uniform on the surface to be scanned by a simple method, and it is possible to provide a scanning optical apparatus that is suitable for high definition printing and an image forming apparatus including the scanning optical apparatus.

Note that, the exemplary embodiment of the present invention is described above, but the present invention is not limited to the embodiment, and various modification and changes can be made thereto within the scope of the sprit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-042071, filed Feb. 28, 2011, which is hereby incorporated by reference herein in its entirety.

What is claimed is:

1. A scanning optical apparatus, comprising:
   two light source units;
   a deflecting unit for deflecting two light beams for scanning emitted from the two light source units by different deflection surfaces; and
   two imaging optical systems disposed corresponding to the two light beams for scanning deflected by the different deflection surfaces of the deflecting unit, wherein:
   the two imaging optical systems form images of the two light beams for scanning deflected by the different deflection surfaces of the deflecting unit on photosensitive members of different hues;
   the two imaging optical systems are disposed to be opposed with respect to the deflecting unit in a sub-scanning cross section; and
   a reflectance of a first reflecting optical element disposed in an optical path between the photosensitive member and the deflection surface passed by a light beam corresponding to an image of a hue having low brightness, between the two light beams emitted from the two light source units, is lower than a reflectance of a second reflecting optical element disposed in an optical path between the photosensitive member and the deflection surface passed by a light beam corresponding to an image of a hue having high brightness, between the two light beams emitted from the two light source units.

2. A scanning optical apparatus according to claim 1, wherein the hue having the low brightness comprises black.

3. A scanning optical apparatus according to claim 1, wherein, defining that Rd denotes the reflectance of the first reflecting optical element, and Rb denotes the reflectance of the second reflecting optical element, the following conditional expression is satisfied $1.2<Rb/Rd<2.5.$ 4. A scanning optical apparatus according to claim 1, wherein each of the two imaging optical systems includes an imaging lens made of a plastic material having an optical surface on which antireflection layer is not formed.

5. A scanning optical apparatus according to claim 1, wherein a light emission amount of the light source unit emitting the light beam corresponding to the image of the hue having the low brightness between the two light beams is larger than a light emission amount of the light source unit emitting the light beam corresponding to the image of the hue having the high brightness between the two light beams.

6. A color image forming apparatus, comprising:
   the scanning optical apparatus according to claim 1; and
   two photosensitive members of hues having different brightnesses.

7. A scanning optical apparatus, comprising:
   two light source units;
   a deflecting unit for deflecting two light beams for scanning emitted from the two light source units by different deflection surfaces; and
   two imaging optical systems disposed corresponding to the two light beams for scanning deflected by the different deflection surfaces of the deflecting unit, wherein:
   the two imaging optical systems form images of the two light beams for scanning deflected by the different deflection surfaces of the deflecting unit on photosensitive members of different hues;
   the two imaging optical systems are disposed to be opposed with respect to the deflecting unit in a sub-scanning cross section;
   when, defining that $LV_0$ denotes a light amount of the light beam for scanning deflected by the deflection surface of the deflecting unit, LV denotes a light amount of the light beam for scanning deflected by the deflection surface of the deflecting unit entering the photosensitive member, and LT denotes an optical efficiency, $LT=LV/LV_0$ is established; and
   a first optical efficiency of an optical path between the photosensitive member and the deflection surface passed by a light beam corresponding to an image of a hue having low brightness, between the two light beams emitted from the two light source units, is lower than a second optical efficiency of an optical path between the photosensitive member and the deflection surface passed by a light beam corresponding to an image of a hue having high brightness, between the two light beams emitted from the two light source units.

8. A scanning optical apparatus according to claim 7, wherein the hue having the low brightness comprises black.

9. A scanning optical apparatus according to claim 7, wherein, defining that Ed denotes the first optical efficiency, and Eb denotes the second optical efficiency, the following conditional expression is satisfied $1.2<Eb/Ed<2.5.$ 10. A scanning optical apparatus according to claim 7, wherein each of the two imaging optical systems includes an imaging lens made of a plastic material having an optical surface on which antireflection layer is not formed.

11. A color image forming apparatus, comprising:
    the scanning optical apparatus according to claim 7; and two photosensitive members of hues having different brightnesses.

\* \* \* \* \*